Nov. 8, 1927.  
J. H. WHITING  
ROTARY AIR MOTOR OR PUMP  
Filed Jan. 30, 1922  
1,648,092  
2 Sheets-Sheet 2
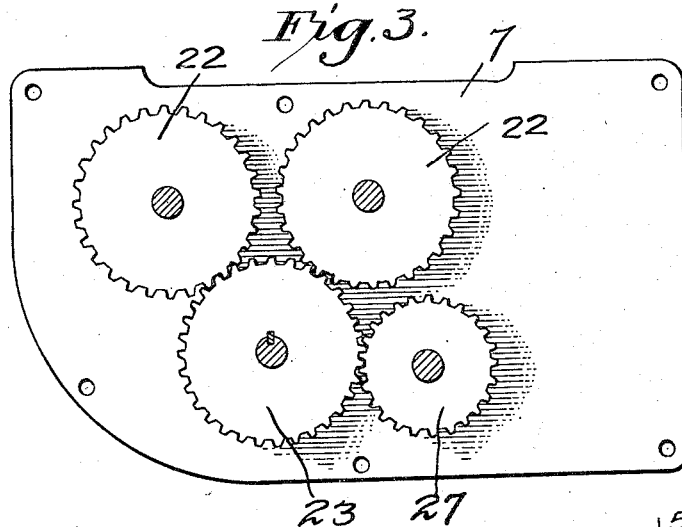
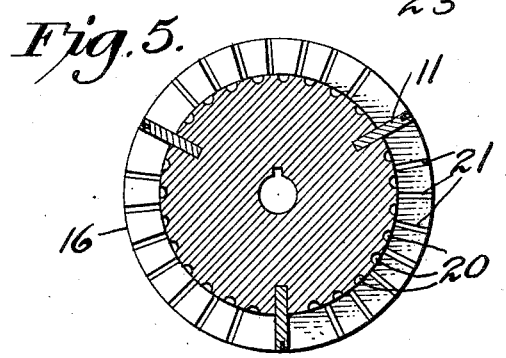
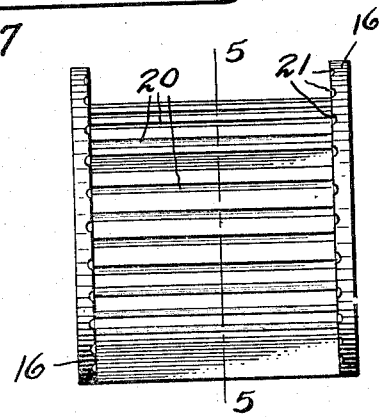
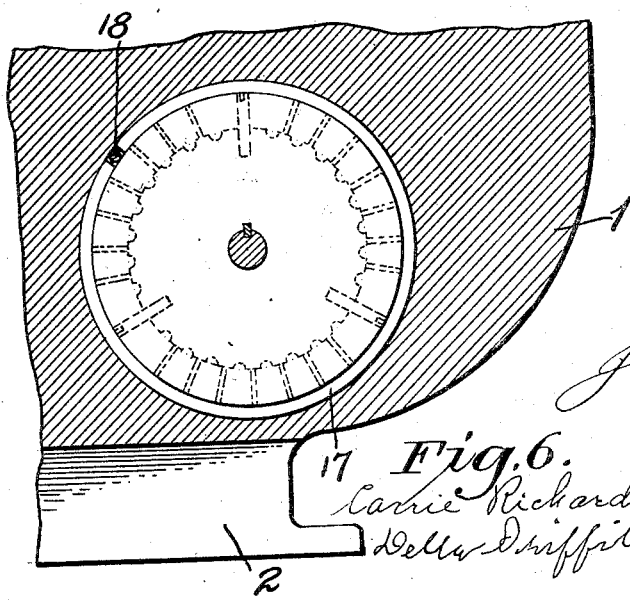

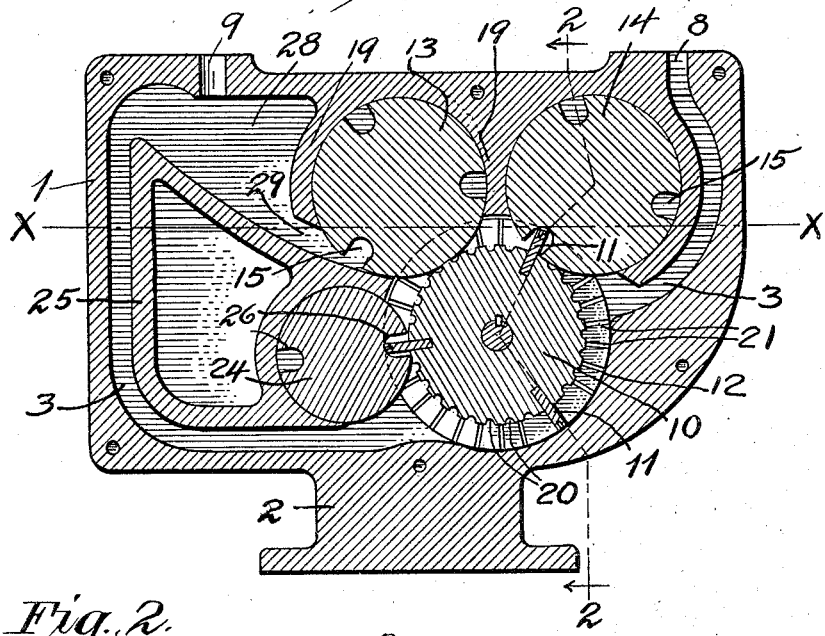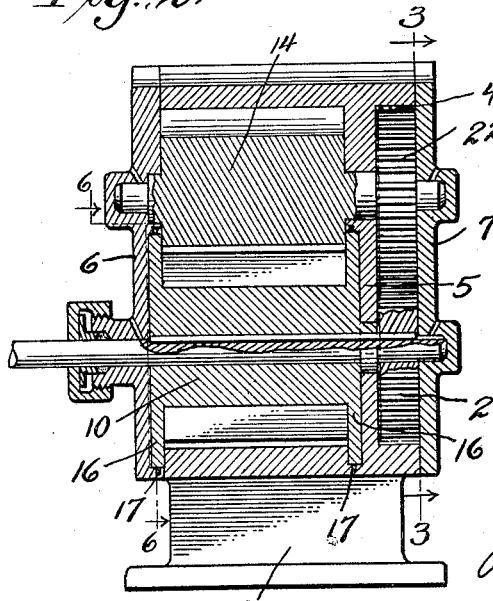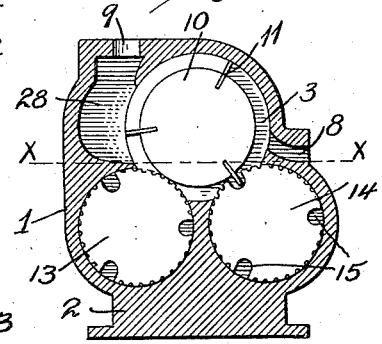

Patented Nov. 8, 1927.

1,648,092

UNITED STATES PATENT OFFICE.

JOHN H. WHITING, OF PUNXSUTAWNEY, PENNSYLVANIA.

ROTARY AIR MOTOR OR PUMP.

Application filed January 30, 1922. Serial No. 532,895.

This invention relates to an improved rotary engine or pump of the type wherein the active element is provided with radially projecting pistons, and cooperates with an arrangement of rotary abutments having recesses to accommodate said pistons at a period of the rotation of the active element.

The principal objects of the invention are to provide an engine or pump of the general structure disclosed in my Letters Patent No. 1,368,869, dated February 15, 1921, and designed especially for use as an air motor or pump; to secure and maintain an efficient lubricant fluid sealing cooperation against leakage or slippage of the driving or driven air among the active element, the abutments and the walls of the chambers in which the abutments operate; to provide an air motor or pump with an efficient fluid separating device whereby the driving or driven air is separated from the sealing fluid and said sealing fluid is retained within the motor or pump; and to provide an air pump or compressor which, through the efficiency of its fluid sealing system, combined with its advantageously organized parts will be capable of generating a much greater pressure of air than is possible by the use of such equipments as are now in use.

With the above objects in view, the invention consists in certain features of structure, combination and relation which will be set forth as the description proceeds.

An embodiment of the invention is illustrated in the accompanying drawings, wherein:—

Figure 1 is a vertical central section;

Fig. 2 is a cross section on the line 2—2 of Fig. 1;

Fig. 3 is a vertical sectional view on the line 3—3 of Fig. 2 showing the mounting of certain gear elements employed for driving the abutments in harmonic relationship with the active element of the structure;

Fig. 4 is a perspective side elevation of the active element;

Fig. 5 is a view taken on line 5—5 of Fig. 4;

Fig. 6 is a vertical end view partly in cross section on line 6—6 of Fig. 2;

Fig. 7 shows an inverted and abbreviated form of the invention.

Similar characters of reference designate corresponding parts throughout the several views.

The operating parts are inclosed in the casing 1 which may be provided with a suitable supporting pedestal 2, and which is formed internally into a working chamber 3 and a gear chamber 4, said chambers having a common wall in the longitudinal partition 5 and being closed by the removable end plates 6 and 7 respectively. The front wall of the casing is provided with a downwardly extending inlet passage 8; and at the rear of the casing, preferably in its upper wall, an opening 9 provides for the discharge of the air which flows through the structure. The passage 8 terminates in adjacency to a transversely arranged active element or rotor 10 which is provided in the direction of its length with radially projecting blades 11, functioning as pistons. The casing is formed below the inlet passage 8 with a cylindrical surface 12 which has an extent slightly exceeding one third of a circle and which cooperates with the pistons 11, the surface 12 projecting downward and backward from the lower end of the passage 8. The element 10 is of cylindrical form and cooperates with three rotary cylindrical abutments 13, 14 and 24 which are arranged transversely of the working chamber and are provided with longitudinal clearances 15 and 26 to accommodate the pistons 11, of which there are three in the embodiment shown.

The active element 10 is provided at its ends with circumscribing flanges 16, these projecting to the same radial extent as the pistons 11. One of the flanges 16 fits in a recess in the side plate 6 and is flush with the surface of said plate, and the other flange 16 fits in a recess in the partition 5 and is flush with the surface of said partition. The recesses in which the flanges are arranged are preferably provided with annular grooves to accommodate suitable contractile packing rings 17 which may be held against rotation by cross-pins 18 (Fig. 6) arranged between their adjacent terminals and secured in the walls of the grooves, the rings 17 preventing the passage of the air beyond the flanges 16.

The abutments 13 and 14 are co-extensive with the active element 10 and operate between the flanges 16 of said element. Said abutments are preferably of the same diameter as the element 10 and are arranged to bear lightly against the surface of said element in such relation that the seal between them and the element will be continuously maintained, each abutment functioning during the passage of the pistons through the clearances of the other abutment. Said abutments are arranged on axes located above the axis of the active element, adjacent the upper wall 19 of the casing 1, and operate in relation to cylindrical surfaces which are arranged within said wall. The side plates 6 and 7 are provided with suitable bearings for the trunnions of the abutments and also for the shaft of the active element. The surface of the active element 10 is provided with small longitudinal grooves 20, and the inner faces of the flanges 16 have radial grooves 21, said grooves cooperating with the surfaces of the abutments in promoting an effectual seal against leakage of the driving or driven air through the contact between the abutments and the active element.

Within the working chamber 3, at the rear of the active element 10, is a fluid separating device consisting of the abutment 24, the partition 25 and the separating chamber 28. This abutment is co-extensive in length with the active element 10 and operates between the flanges 16 of said element. For economy of space, this abutment 24 is but two thirds the diameter of the active element 10, and is provided with only two longitudinal clearances 26 for the accommodation of the pistons 11. To compensate for the smaller size of this abutment 24, it is geared to rotate at one half faster speed. Said abutment 24 is arranged on an axis parallel with that of the active element 10 and bears lightly against the surface thereof. Said abutment 24 also operates in relation to a cylindrical surface in the partition 25. All of the abutments and partitions are co-extensive with the working chamber and flush with the surface of the casing 1 where it is closed by the end plate 6, thus confining the fluids to their specified channels.

The shaft of the active element 10 and the trunnions of all the abutments extend through the partition 5 and into the gear chamber 4, where they are provided with gears which intermesh in the manner shown in Fig. 3, whereby each abutment is driven by the shaft of the active element at such rate of speed as to enable the clearances of the abutments to function properly with the pistons 11 of the active element. Since the abutments 13 and 14 are of the same diameter as the active element, their gears 22 are the same diameter as the gear 23 which is on the shaft of the active element, and since the abutment 24 is but two thirds the diameter of the active element, its gear 27 is but two thirds the diameter of the gear 23, thus giving the abutment 24 the same peripheral speed as the active element and enabling the two clearances of the said abutment to function properly with the three pistons of the active element.

In operation, the working chamber is provided with a lubricant sealing fluid in a quantity sufficient to submerge the active element, as represented by the line X—X of Fig. 1. Regardless of whether the machine is used as a motor or as a pump, the passing air, either driving or driven, enters the structure through the inlet passage 8, passes under the active element 10 and is prevented by the abutment 24 from accompanying the pistons 11 as they pass upward at the rear of the active element, and is thus compelled to follow the passage 3 around to the rear of the partition 25 and upward into the separating chamber 28. While the air is thus passing along the above described channel, the lubricant sealing fluid is likewise forced along with it, and upon entering the chamber 28, the sealing fluid is attracted by gravity and descends to the lower outlet 29 of the said chamber from whence it is carried across the active element 10 by the clearances 15 of the abutments 13 and 14, and is thus returned to the inlet side of the structure, while the air passes out at the discharge opening 9.

In cases where it is desired to practice rigid economy of space it may be advisable to use the inverted and abbreviated form shown in Fig. 7, in which the active element 10 is located above the abutments 13 and 14, and in which the abutment 24 and the partition 25 may be dispensed with.

I claim as my invention:—

1. In a machine of the type set forth, in combination with a casing having a single air passage, a rotary cylindrical active element cooperating with said passage, two rotary cylindrical abutments cooperating with said active element, means for providing a fluid seal against leakage or slippage of the passing air, means for separating the sealing fluid from the passing air, said means embodying a third rotary cylindrical abutment engaging the rear side of said active element, three blades functioning as pistons projecting radially from the cylindrical surface of said active element and spaced equi-distant apart, said abutments having clearances for said pistons, said third abutment being so positioned as to prevent the passing air from accompanying the pistons upward at the rear side of the said active element.

2. In a machine of the type set forth comprising a casing having a single air channel in combination with a rotary cylindrical active element co-operating with said channel, three rotary cylindrical abutments engaging said active element, three pistons projecting radially from the surface of the active element and spaced equi-distant apart, said abutments having clearances for said pistons and being arranged whereby one of said abutments will be in sealing engagement with the active element substantially centrally of the surface between two adjacent clearances when a piston is passing through a clearance in the other abutment, means for retaining a continuous lubricant and fluid seal within the casing, said means comprising a separating chamber having a fluid inlet, an upper air outlet and a lower fluid outlet toward the active element.

In testimony whereof I affix my signature.

JOHN H. WHITING.